(12) United States Patent
Chou

(10) Patent No.: US 6,419,432 B1
(45) Date of Patent: Jul. 16, 2002

(54) NET FOR SECURING OBJECTS

(76) Inventor: An-Chuan Chou, No. 212, Yung An Street, Tainan (TW)

( * ) Notice: Subject to any disclaimer, the term of this patent is extended or adjusted under 35 U.S.C. 154(b) by 0 days.

(21) Appl. No.: 09/729,744

(22) Filed: Dec. 6, 2000

(51) Int. Cl.[7] .................................................. B60P 7/08
(52) U.S. Cl. ........................................ 410/97; 410/118
(58) Field of Search ............................ 410/96, 97, 100, 410/117, 118; 87/2; 248/499; 296/100.15, 100.16

(56) References Cited

U.S. PATENT DOCUMENTS

| | | | | | |
|---|---|---|---|---|---|
| 2,669,402 A | * | 2/1954 | Del Mar | ...................... | 410/118 |
| 3,486,723 A | * | 12/1969 | Harrison | ...................... | 410/118 |
| 4,900,204 A | * | 2/1990 | Summers | ...................... | 410/97 |
| 5,848,864 A | * | 12/1998 | Selby | ........................... | 410/97 |
| 6,017,174 A | * | 1/2000 | Ross et al. | ................... | 410/100 |
| 6,152,664 A | * | 11/2000 | Dew et al. | ................... | 410/100 |
| 6,217,268 B1 | * | 4/2001 | Chou | ........................... | 410/97 |

* cited by examiner

Primary Examiner—Stephen T. Gordon
(74) Attorney, Agent, or Firm—Rosenberg, Klein & Lee

(57) ABSTRACT

A net for securing objects has a central ring, a rope, fixing elements and hooking elements. The rope is arranged to form several shaped loops each having an inner pointed end portion passes through the central ring. Other parts of the rope are arranged to cross intermediate portions of the shaped loops, approaching the central ring. The fixing elements are fastened to the pointed end portions, and intersections of all parts of the rope. The hooking elements are fastened to the outermost parts of the net for permitting the net to be tied to rack to secure objects on the rack.

3 Claims, 4 Drawing Sheets

NET FOR SECURING OBJECTS

BACKGROUND OF THE INVENTION

The present invention relates to a net for securing objects, and particular to one which is used to secure luggage to the luggage rack of a station wagon, jeep, etc.

Station wagons and jeeps can carry luggage on the luggage rack on the top, and nets are used to secure the luggage to the rack; thus, the station wagons and the jeeps can carry more luggage in travelling.

Referring to FIGS. 4 and 5, a conventional securing net has a central ring 10, several longitudinal ropes 20 and several transverse ropes 30.

Each of the longitudinal ropes 11 is connected to the central ring 10 from an inner end; referring specifically to FIG. 5, the inner end forms a connecting loop 201 round the central ring 10, and is connected to a fixing element 40 such that the inner end of the transverse rope 30 is fixed to the central ring 10.

The transverse ropes 30 are each arranged across the longitudinal ropes 20, forming a circle around the central ring 10; two ends of each of the transverse ropes 30 are connected to each other by a fixing element (not numbered). The intersections of the transverse ropes 30 and the longitudinal ropes 20 are each connected to a fixing element 40. Furthermore, outer ends of the longitudinal ropes 20 each forms a loop around the outermost one of the transverse ropes 30, and is connected to a fixing element. Thus, the ropes 20 and 30 are connected to form a net.

Hooking elements 50 are connected to the outermost transverse rope 30.

Thus, the net can be used to secure the luggage to the rack on the top of a station wagon with the hooking elements 50 connected to the rack.

However, it is found that the conventional securing net has disadvantages as follows.

1. Being more or less elastic, the longitudinal ropes and the transverse ropes will be lengthened, and become thinner when tied on the luggage. Therefore, when the fixing elements connecting the intersections of the ropes are likely to loosen off the ropes, and the net can't secure luggage any longer.

2. The securing net is made of many separate ropes so it cost relatively much labor to manufacture, and the cost is high.

SUMMARY OF THE INVENTION

Therefore, it is a main object of the present invention to provide a securing net for use on the top luggage rack of a station wagon, which is relatively strong, and has low manufacturing cost.

The securing net of the present invention has a central ring, a rope, fixing elements and hooking elements.

The central ring is disposed in the middle of the net.

The rope is arranged to form several shaped loops each having an inner pointed end portion passed through the central ring. Other parts of the rope are arranged to cross the intermediate portions of the shaped loops, approaching the central ring.

The fixing elements are connected to each of the inner pointed end portions to fix same to the central ring, and are connected to each of the intersections of the rope to fasten the rope forming a net.

The hooking elements are coupled to outermost parts of the rope for permitting the net to be tied to a rack to secure objects on the rack.

BRIEF DESCRIPTION OF THE DRAWINGS

This invention will be better understood by referring to the accompanying drawings, wherein.

DESCRIPTION OF THE PREFERRED EMBODIMENT

Figure 1:
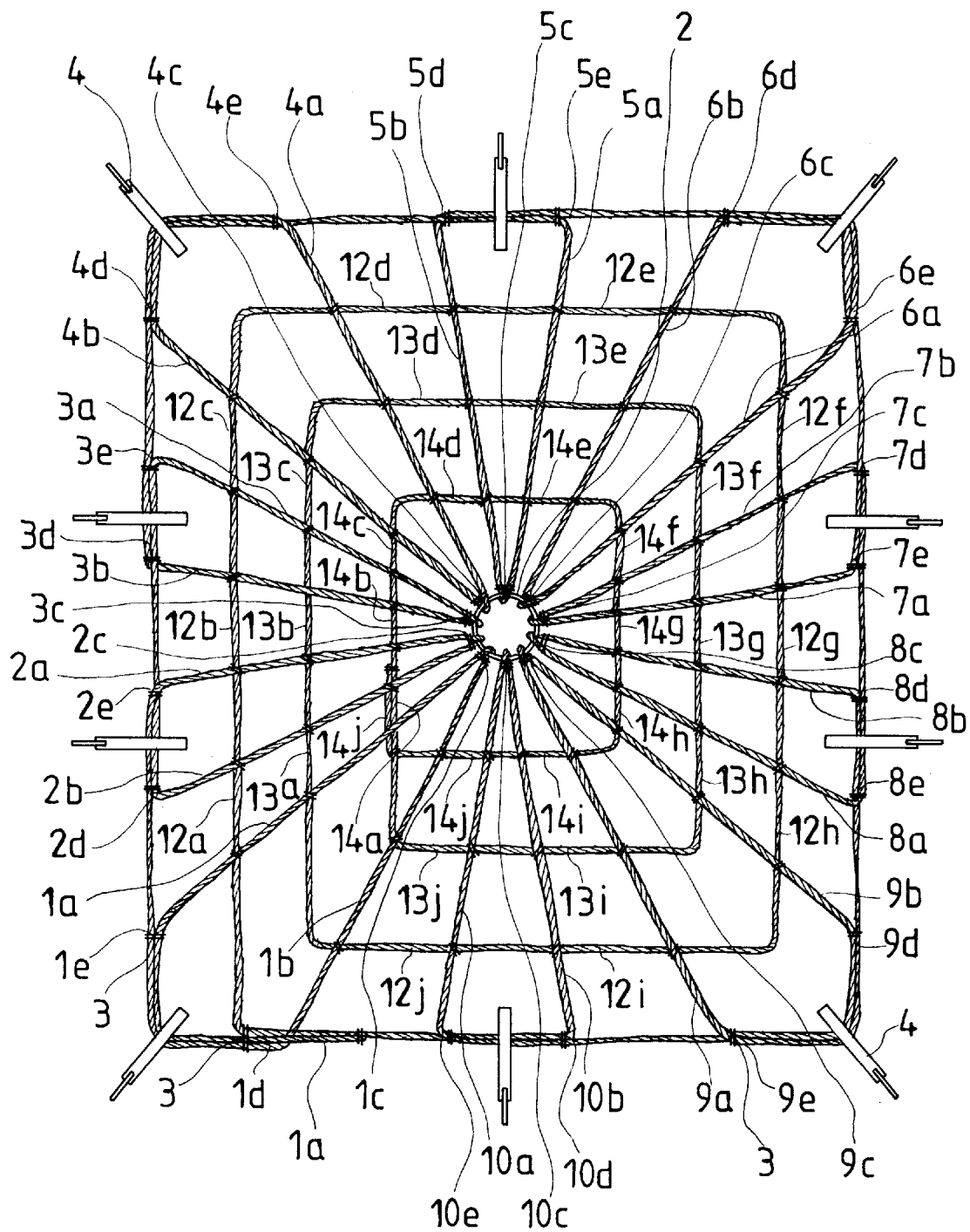
FIG. 1 is a top view of the securing net of the present invention.

Referring to FIG. 1, a securing net of the present invention has a rope 1 arranged into a net, a central ring 2, fixing elements 3 and hooking elements 4.

Figure 2:
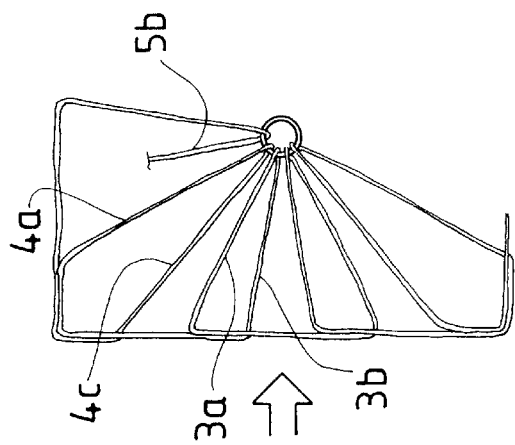
FIG. 2 is a view showing the process of arranging the rope into the net of the present invention.
Figure 2:
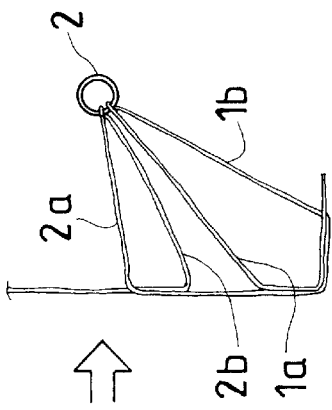
Figure 2:
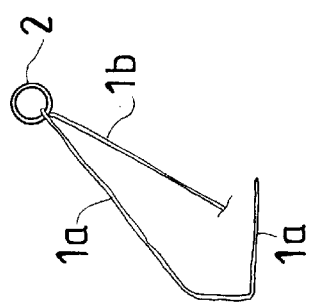
Figure 2:
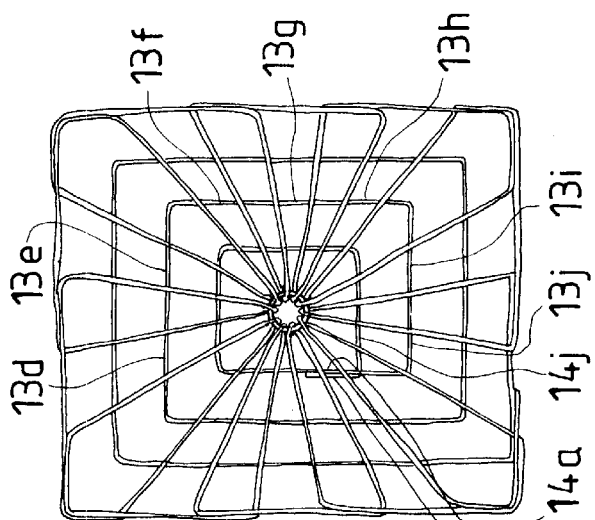
Figure 2:
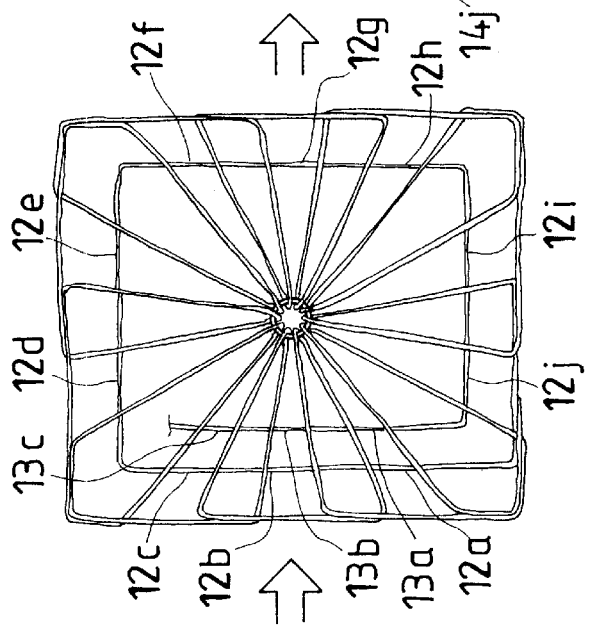
Figure 2:
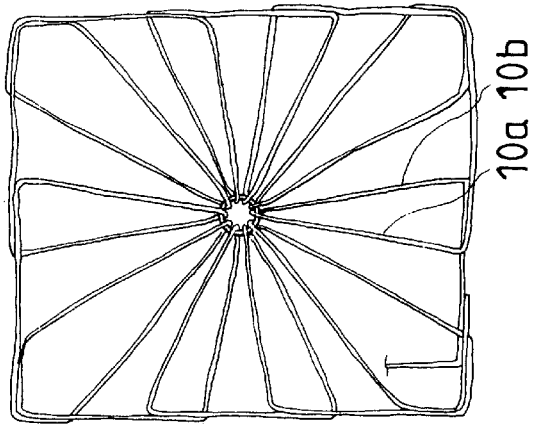
Figure 3:
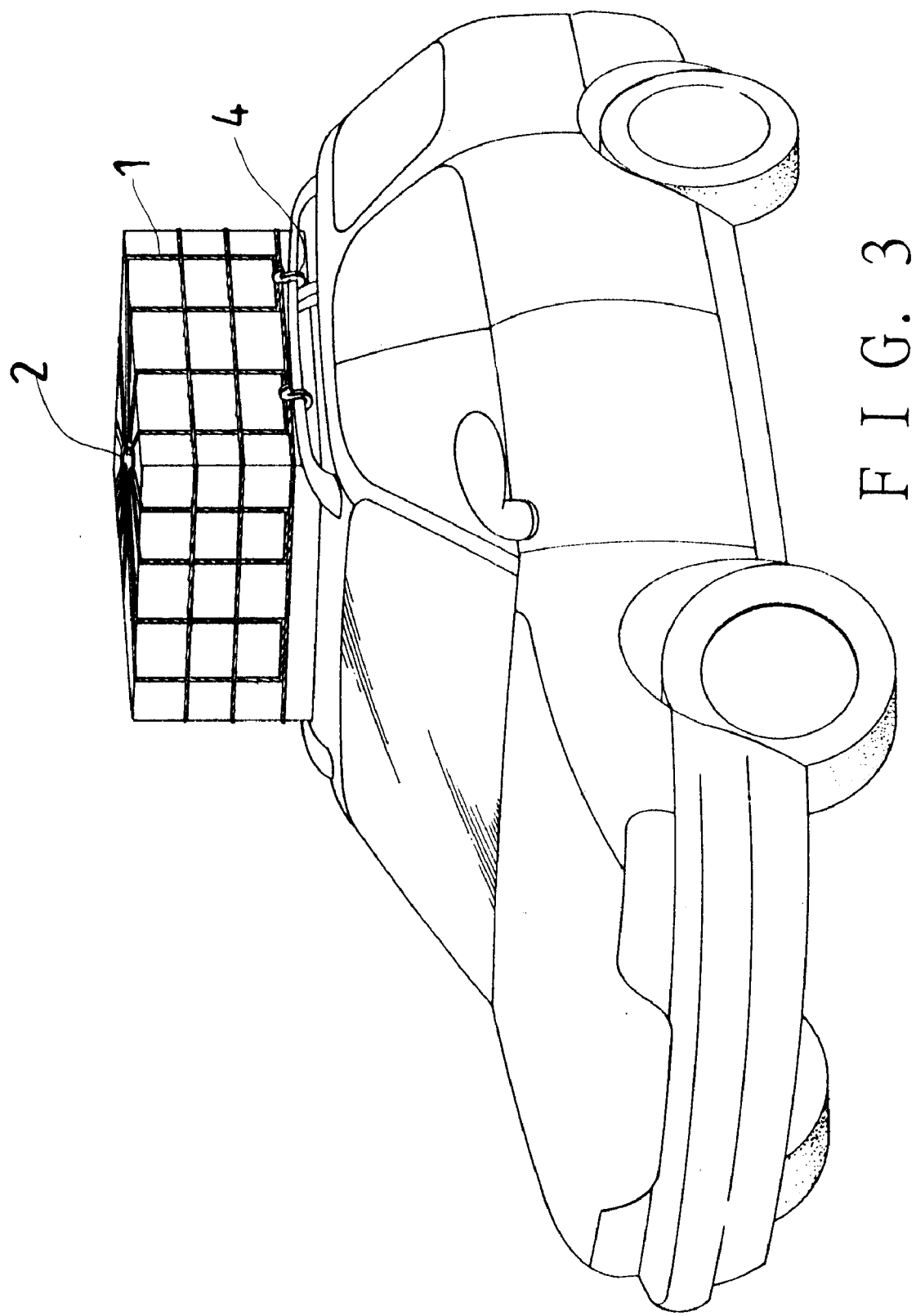
FIG. 3 is a view showing the securing net being used on a luggage rack according to the present invention.
Figure 5:
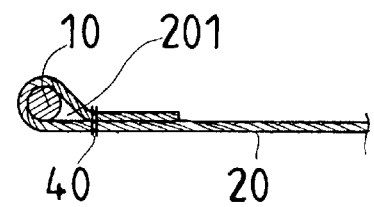
FIG. 5 is a fragmentary cross-sectional view of the conventional securing net.
Figure 4:
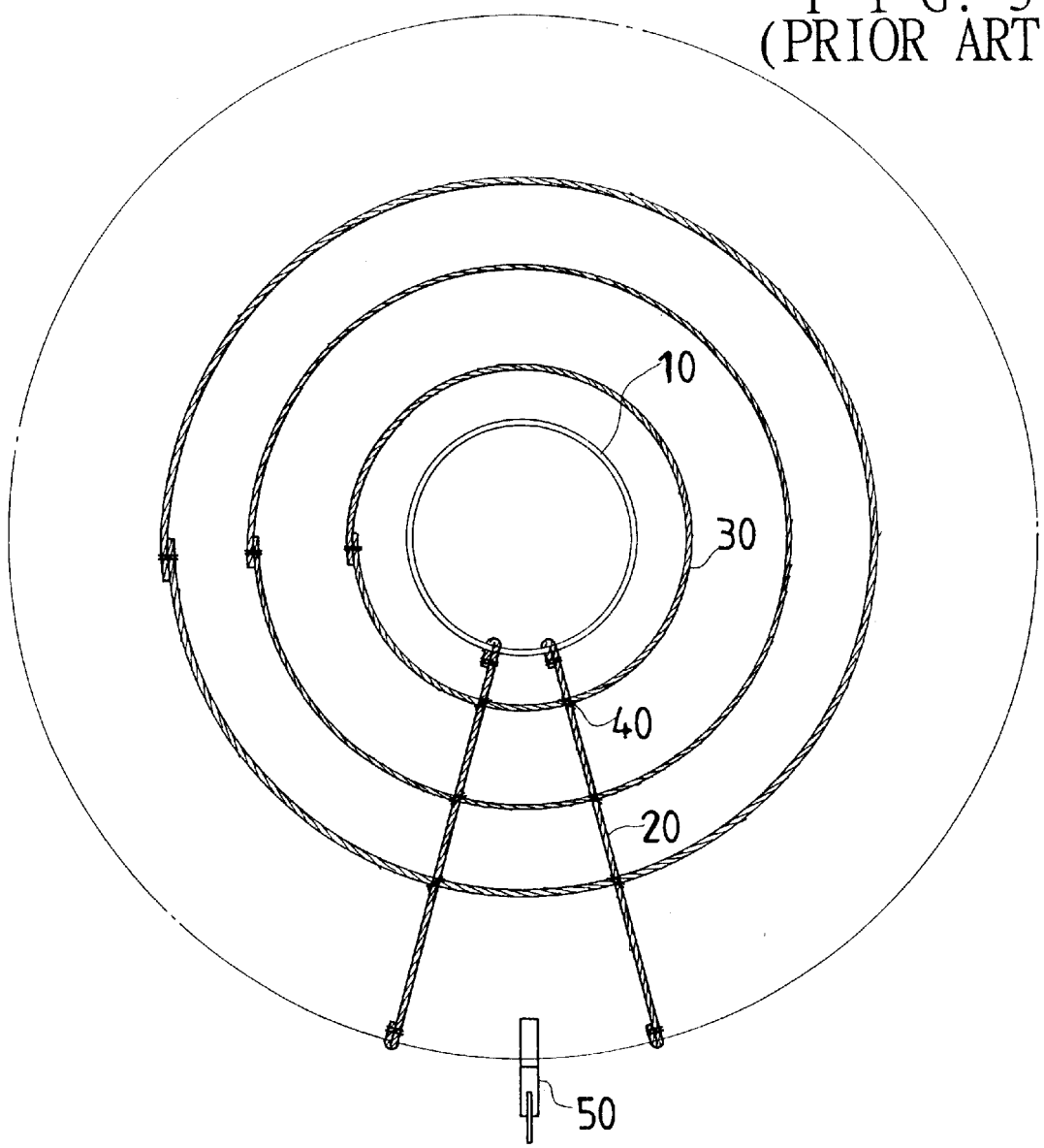
FIG. 4 is a view of the conventional securing net in the Background.

Referring to FIG. 2, an outer end portion of the rope 1 is firstly arranged to have a first shaped loop; the first shaped loop has an inner pointed end portion passed through the central ring 2, forming a left portion 1a and a right portion 1b.

Secondly, the part of the rope 1 adjacent to the first shaped loop is arranged to form a second shaped loop, third shaped loop, a fourth shaped loop, a fifth shaped loop, a sixth shaped loop, a seventh shaped loop, a eighth shaped loop, a ninth shaped loop and tenth shaped loop in sequence, having left portions 2a, 3a, 4a, 5a, 6a, 7a, 8a, 9a and 10a respectively, and right portions 2b, 3b, 4b, 5b, 6b, 7b, 8b, 9b and 10b respectively. The second shaped loop and so on also have inner pointed end portions passed through the central ring 2. The outer portions of the shaped loops form a rectangle in the drawings but the net can be made into various shaped, such as round shapes. The fixing elements 3 are connected to the innermost portions 1c, 2c, 3c, 4c, 5c, 6c, 7c, 8c, 9c and 10c of the shaped loops for securing same to the central ring 2.

Thirdly, the part of the rope 1 adjacent to the tenth shaped loop are arranged to cross intermediate portions of the shaped loops with several rectangular shapes, approaching the center of the net, forming portions 12a, 12b, 12c, 12d, 12e, 12f, 12g, 12h, 12i, 12j, 13a, 13b, 13c, 13d, 13e, 13f, 13g, 13h, 13i, 13j, 14a, 14b, 14c, 14d, 14e, 14f, 14g, 14h, 14i, and 14j defined by the shaped loops. The parts of the rope crossing the shaped loops can also be arranged into circles.

Fixing elements are also connect to intersections of the rope 1, i.e. 1d, 1e, 2d, 2e, 3d, 3e, 4d, 4e, 5d, 5e, 6d, 6e, 7d, 7e, 8d, 8e, 9d, 9e, 10d, 10e etc. to connect the shaped loops.

The hooking elements 4 are fitted to the outermost portion of the net, preferably the parts of the outermost portion which have tow rope parts combined together in order for the hooking elements 4 to be secure, and for the net to be stronger when tied to luggage.

Thus, the net can be used to secure the luggage to the rack on the top of a station wagon with the hooking elements 4 connected to the rack.

From the above description, the securing net of the present invention can be known to have desirable features as follows.

1. Being made of only one rope, the manufacturing of the securing net would cost less labor than the conventional one.

2. Because the net is made of one single rope, we only has to strengthen the securing of the outer end and the inner end of the rope to make the net relatively strong. Therefore, the net can overcome the disadvantages of the conventional one which is likely to loosen.

What is claimed is:

1. A net for securing objects, comprising:

a central ring disposed in a middle portion, a rope, said rope being arranged to form a plurality of shaped loops each having an inner pointed end portion passed through said central ring; other parts of said rope being arranged to cross intermediate portions of said shaped loops forming intersections of said rope, approaching said central ring;

a plurality of fixing elements, said fixing elements being connected to each of said inner pointed end portions to fix said inner pointed end portions to said central ring, and being connection to each intersection of said rope to fasten said rope forming a net; and, a plurality of hooking elements coupled to outermost parts of said rope for permitting said net to be tied to a rack to secure objects on said rack.

2. The net for securing objects as claimed in claim 1, wherein an outer periphery of said net enclosed by outer portions of said shaped loops form a rectangle.

3. The net for securing objects as claimed in claim 1, wherein said other parts of said rope crossing said intermediate portions of said shaped loops have rectangular shapes.

* * * * *